(12) United States Patent
Goto

(10) Patent No.: US 6,975,882 B2
(45) Date of Patent: Dec. 13, 2005

(54) CRADLE FOR PORTABLE TERMINAL FOR PRINTING IMAGE BASED ON PRINT INFORMATION PREVIOUSLY RESERVED WITH PORTABLE TERMINAL AT THE TIME CONNECTION TO PORTABLE TERMINAL

(75) Inventor: Shinya Goto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/234,746

(22) Filed: Sep. 4, 2002

(65) Prior Publication Data

US 2003/0054859 A1    Mar. 20, 2003

(30) Foreign Application Priority Data

Sep. 19, 2001  (JP) .............................. 2001-285111

(51) Int. Cl.⁷ .............................................. H04M 1/00

(52) U.S. Cl. ................. 455/556.1; 455/557; 455/550.1

(58) Field of Search ................................. 455/556, 557, 455/550, 556.1, 550.1; 358/1.1

(56) References Cited

U.S. PATENT DOCUMENTS

| | | | |
|---|---|---|---|
| 6,035,205 A * | 3/2000 | Han | |
| 6,405,055 B1 * | 6/2002 | Silverbrook et al. | |
| 6,647,102 B2 * | 11/2003 | Hirai et al. | 358/400 |
| 2002/0013869 A1 * | 1/2002 | Taniguchi et al. | |
| 2002/0051136 A1 * | 5/2002 | Kawamura et al. | 358/1.1 |
| 2002/0103675 A1 * | 8/2002 | Vanelli | 705/3 |
| 2003/0002073 A1 * | 1/2003 | Berkema et al. | 455/557 |
| 2003/0038963 A1 * | 2/2003 | Yamaguchi | |

FOREIGN PATENT DOCUMENTS

| | | |
|---|---|---|
| JP | 09-284847 | 3/1989 |
| JP | 10-065773 | 10/1997 |

\* cited by examiner

*Primary Examiner*—Joseph Feild
*Assistant Examiner*—Huy D. Nguyen
(74) *Attorney, Agent, or Firm*—Cowan, Liebowitz & Latman, P.C.

(57) ABSTRACT

A cradle for a portable terminal includes a connection unit for connecting a portable terminal, a print instruction key for a user to instruct print, and a storage unit for storing print information previously reserved. When the portable terminal is connected to the connection unit, and the print instruction key is pressed down, a predetermined image is printed based on the print information previously reserved in the portable terminal.

13 Claims, 6 Drawing Sheets

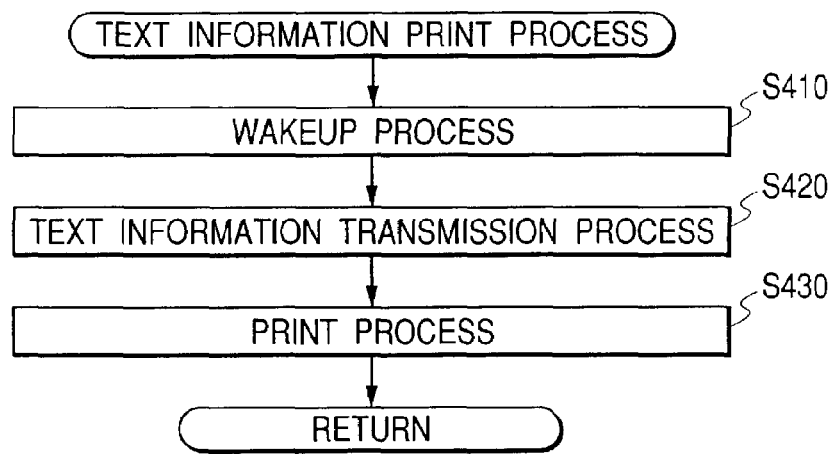
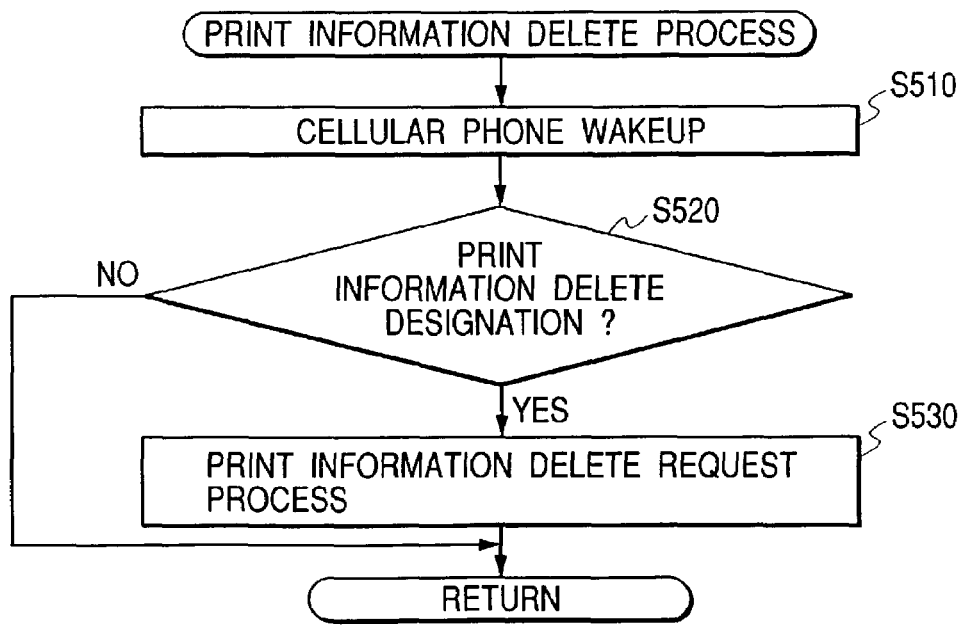

CRADLE FOR PORTABLE TERMINAL FOR PRINTING IMAGE BASED ON PRINT INFORMATION PREVIOUSLY RESERVED WITH PORTABLE TERMINAL AT THE TIME CONNECTION TO PORTABLE TERMINAL

BACKGROUND OF THE INVENTION

1. Field of the Invention

The present invention relates to a cradle for a portable terminal for printing an image based on print information previously reserved with the portable terminal at the time of connection to the portable terminal.

2. Related Background Art

As for a printer which is connected to a cellular phone and performs printing, there is one which is connected to a cellular phone with a connection cable of serial transmission and performs printing under the instruction of the cellular phone. It is possible to connect the cellular phone and a PC with a connection cable of serial transmission and to print information from the cellular phone on a printer connected to the PC.

For example, Japanese Patent Application Laid-Open No. 9-284847 proposes a system which receives and stores image information by facsimile communication with portable radio communication equipment, transmits the stored image information to facsimile by the facsimile communication and prints it. Ringing is outputted via a cable to output the stored image information and electric power is supplied to a battery inside the portable radio communication equipment at the time of connection by means of a cable.

Japanese Patent Application Laid-Open No. 10-65773 proposes an internet terminal device which performs Internet connection via a connection terminal to a PHS telephone set or a modem for connecting public telephone line, and performing input of the information by a remote control operation while displaying the information on a television. A device or the like containing a function of charging the power battery of a PHS telephone set and such a terminal function in a telephone set or a FAX machine is also proposed therein. Further, in the embodiment of the specification, an example of connection of a printer is also described. However, in the process of performing printing with a printer connected to a cellular phone, and in the process of connecting a cellular phone to a PC and performing printing with a printer connected to the PC, it is necessary to designate print information at the time of connection to the printer to perform printing, and thus the operation is complicated. When it is desired to print the information obtained from the Internet, and to print an image picked up in the digital camera function, it is necessary to transmit the print information via the Internet, or to store the print information in a predetermined form, or to carry a printer (another portable device) in a laborious manner to be connected thereto for printing.

Further, Japanese Patent Application Laid-Open No. 9-284847 proposes transmission and reception of image information by facsimile communication and printing in a facsimile, while the proposal does not include the case of printing of print information using Internet connection by a cellular phone and picture taking by a digital camera which are now popular. Japanese Patent Application Laid-Open No. 10-65773 proposes an Internet terminal using a PHS telephone set and a public telephone line, and only shows a printer for performing printing in the embodiment.

SUMMARY OF THE INVENTION

The present invention has its object to make it possible to print a predetermined image by a simple operation based on print information previously reserved in a cellular phone.

BRIEF DESCRIPTION OF THE DRAWINGS

FIG. 8 is a flowchart of a text information print process in step S110 of FIG. 4; and FIG. 9 is a flowchart of a print information delete process in step S115 of FIG. 4.

DESCRIPTION OF THE PREFERRED EMBODIMENTS

A cradle type printer device for a portable terminal according to an embodiment of the present invention will be described in detail below.

Figure 1:
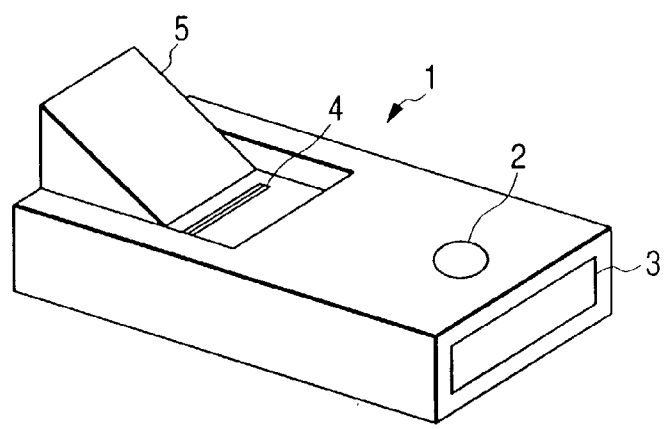
FIG. 1 is an outline view of a cradle type printer device for a portable terminal according to an embodiment of the present invention.

FIG. 1 is an outline view of the cradle type printer device for the portable terminal according to the embodiment of the present invention.

In FIG. 1, a cradle type printer device 1 for a portable terminal includes an instruction key 2 for instructing execution of printing, an insertion port 3 in which a sheet cartridge 106 in FIG. 3 that will be described later is inserted to supply printing paper, a cellular phone placing portion 5 on which a cellular phone 200 in FIG. 2 that will be described later is placed, and a connecter 4 for connecting to the cellular phone 200 when the cellular phone 200 is placed on the cellular phone placing portion 5.

Figure 2:
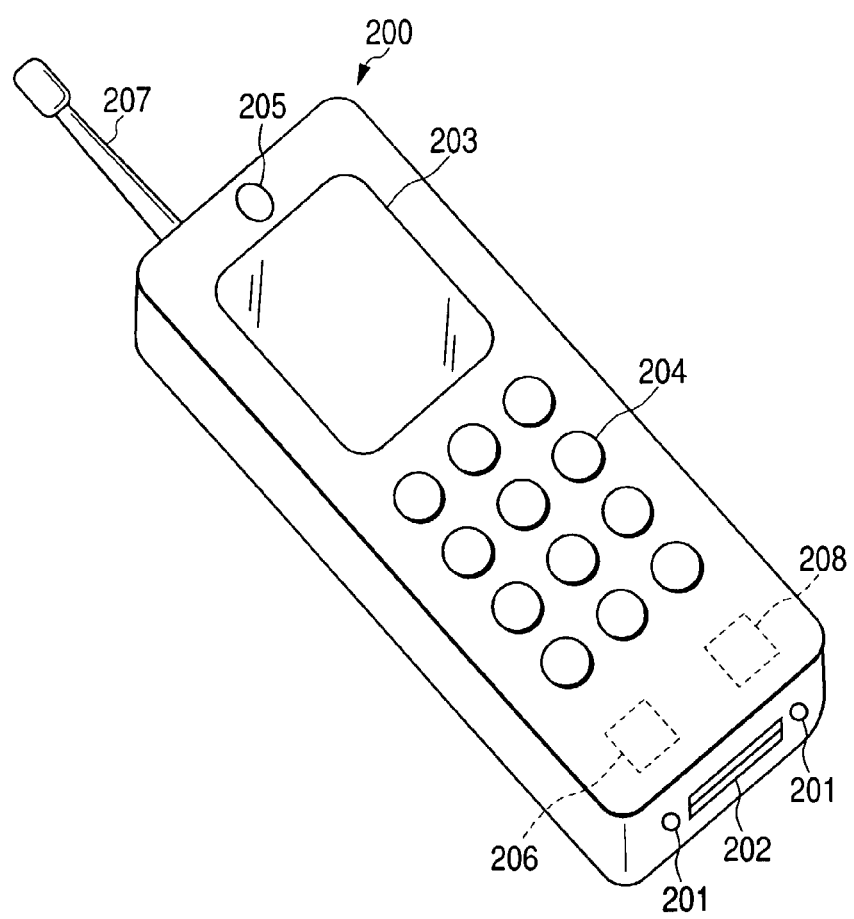
FIG. 2 is an outline view of the portable terminal which is connected to a cradle type printer device 1 for the portable terminal.

FIG. 2 is an outline view of the portable terminal 200 which is connected to the cradle type printer device 1 for the portable terminal in FIG. 1.

In FIG. 2, as for the portable terminal 200 which is connected to the cradle type printer device 1 for the portable terminal, cellular phones such as PDC (Personal Digital Cellular) of Japan, IS-54 and IS-95 of North America, GSM (Global System for Mobile Communication) and IMT-2000 (international mobile telecommunication 2000) of Europe and the like, PHS telephone sets (Personal Handy-phone System), PDA (personal digital assistants), and digital cameras can be used. The cellular phone 200 includes an electric power connector 201 which is connected to the cellular phone placing portion 5 and the connector 4 in FIG. 1 to charge an internal battery of the cellular phone 200, a data connector 202 which is connected to the connector 4 when the cellular phone 200 is placed on the cellular phone placing portion 5 in FIG. 1 to perform data communication with the cradle type printer device 1 for the portable terminal, a display device 203 for displaying various images, an operation unit 204 which is used by a user to perform various operations, an image pickup unit 205 having a digital camera function of electronically picking up an image of a subject, and an antenna 207. The cellular phone 200 includes therein communication means 206 for performing data communication by Internet connection, and a storage unit 208 for storing information which is previously reserved as print information.

Data for which the communication means 206 performs data communication includes objects of URL (uniform resource locator) and e-mails which are obtained by performing Internet connection via the antenna 207, for example.

The operations which the user performs by using the operation unit 204 includes, for example, designation of information which is desired to be printed, pickup of an image of a subject by the image pickup unit 205, receiving an object of a desired URL by the communication means 206 and display of the object by the display device 203, transmission and reception of e-mails, error release when a print error occurs in the cradle type printer device 1 for the portable terminal, and designation of deletion of print information when printing of the print information is normally finished in the cradle type printer device 1 for the portable terminal.

The display device 203 displays error information when a print error occurs in the cradle type printer device 1 for the portable terminal, an object of the URL received by the communication means 206, e-mails transmitted and received, and the like.

The print information stored by the storage unit 208 includes, for example, information from a URL an object of which is desired to be printed (hereinafter called "URL information"), out of the URLs received by the communication means 206 designated as the information printed by operation of the operation unit 204, image information which is desired to be printed out of still images picked up by the image pickup unit 205 (hereinafter called "still image information"), and text information such as e-mail information and address information.

Figure 3:
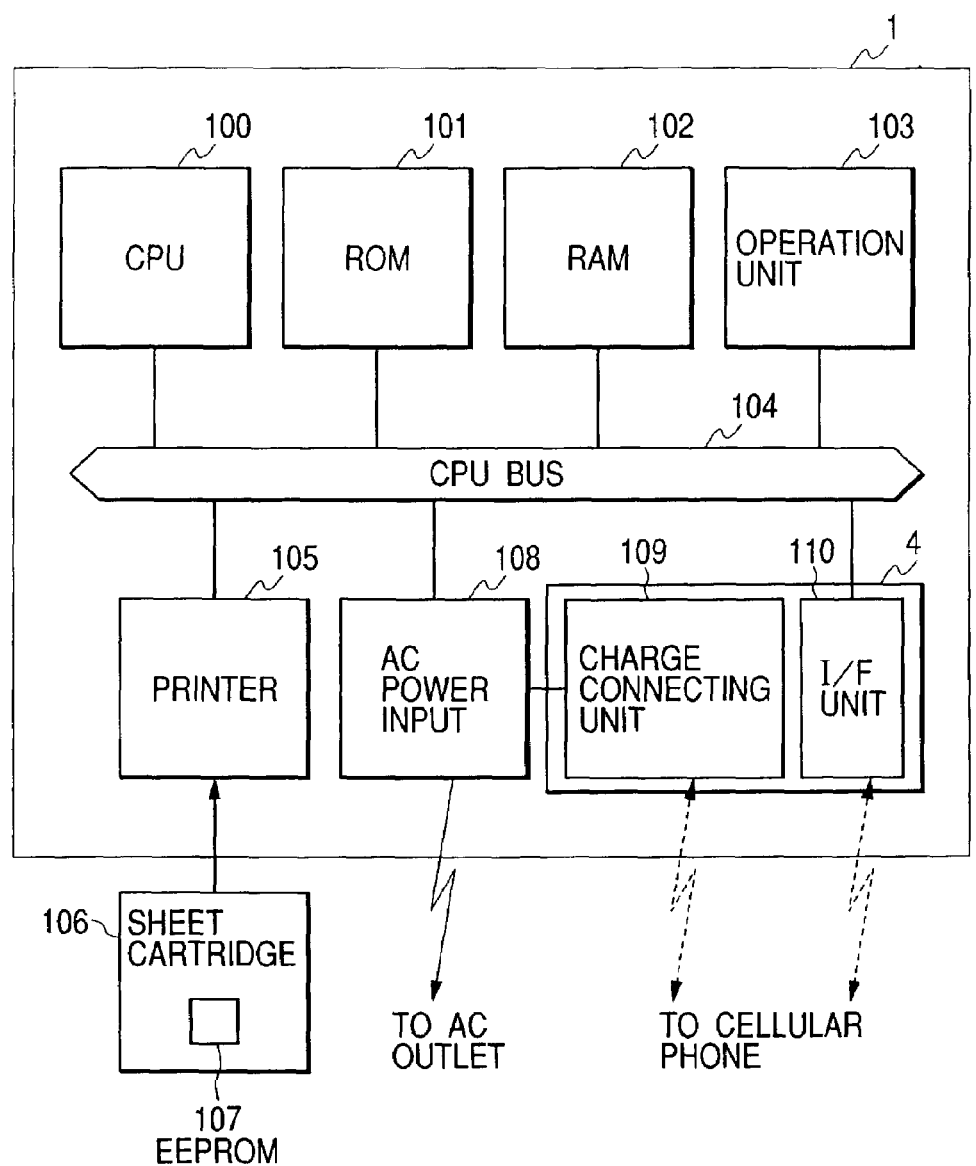
FIG. 3 is a block diagram showing an internal constitution of the cradle type printer device 1 for the portable terminal.

FIG. 3 is a block diagram showing an internal constitution of the cradle type printer device 1 for the portable terminal in FIG. 1.

In FIG. 3, the cradle type printer device 1 for the portable terminal includes a microcomputer (hereinafter called "CPU") 100 for performing communication process with the cellular phone 200 and printing process, a ROM 101 for storing various programs of communication process with the cellular phone 200 and print process which are executed by the CPU 100, and other data, a RAM 102 which is used as an operation area on executing various programs stored in the ROM 101 and an area in which print information transmitted from the cellular phone 200 via an I/F unit 110 is temporarily stored, and an operation unit 103 at which a user performs execution instruction of printing by pressing down the instruction key 2. In this embodiment, only one instruction key 2 is used, but the instruction key 2 may be constituted by a plurality of switches according to the difference of printing process and the like.

The cradle type printer device 1 for the portable terminal further includes a CPU bus 104 being an address bus for transmitting an address signal, a control bus for transmitting a control signal and data bus for transmitting various kinds of data, a printer 105 for printing print information, an AC power input unit 108 which supplies power from an AC consent to the cradle type printer device 1 for the portable terminal, and the connector 4 in FIG. 1. The connector 4 integrally includes a charge connecting unit 109 for charging the internal power source of the cellular phone 200 and an I/F unit 110 for performing transmission of print information from the cellular phone 200.

In this embodiment, the connector 4 in which the charge connecting unit 109 and the I/F unit 110 are integrated is used, but it may be suitable to make them separate connectors without being integrated with each other.

The CPU bus 104 is directly connected to the CPU 100, the ROM 101, the RAM 102, the operation unit 103, the printer 105, the AC power input unit 108, and the I/F unit 110, and performs transmission of various kinds of signals.

The printer 105 performs printing when the sheet cartridge 106 is inserted into the insertion port 3 of the printer device 1. At this time, the printer 105 performs reading of the information described in an EEPROM 107 inside the sheet cartridge 106 in addition to the printing.

The charge connecting unit 109 being one of the components of the connector 4 is connected to the AC power input unit 108, and supplies power from the AC power input unit 108 to the internal power source of the cellular phone 200 when the cellular phone 200 is connected to the connector 4.

Figure 4:
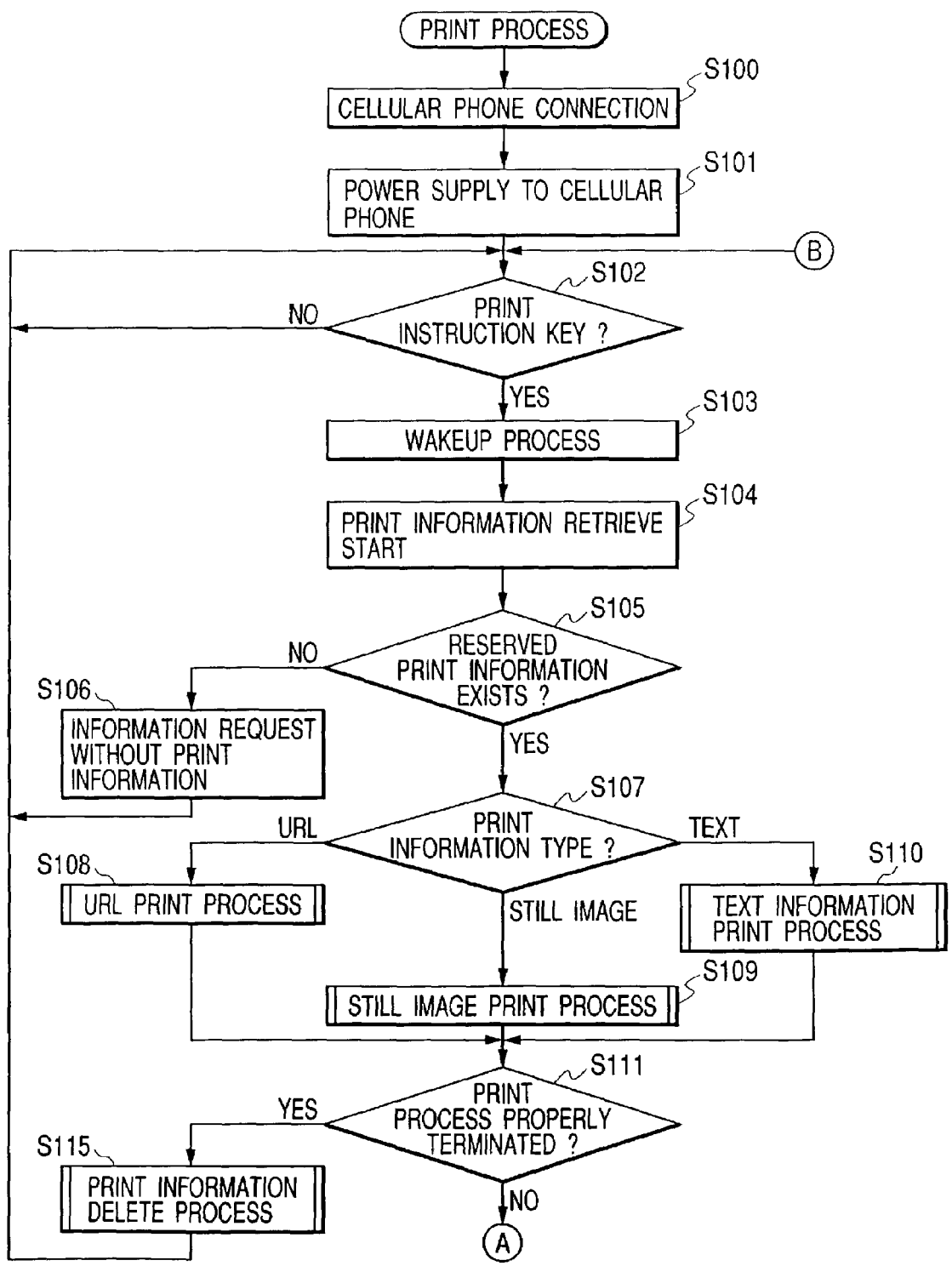
FIG. 4 is a flowchart of a print process which is executed in the cradle type printer device 1 for the portable terminal.
Figure 5:
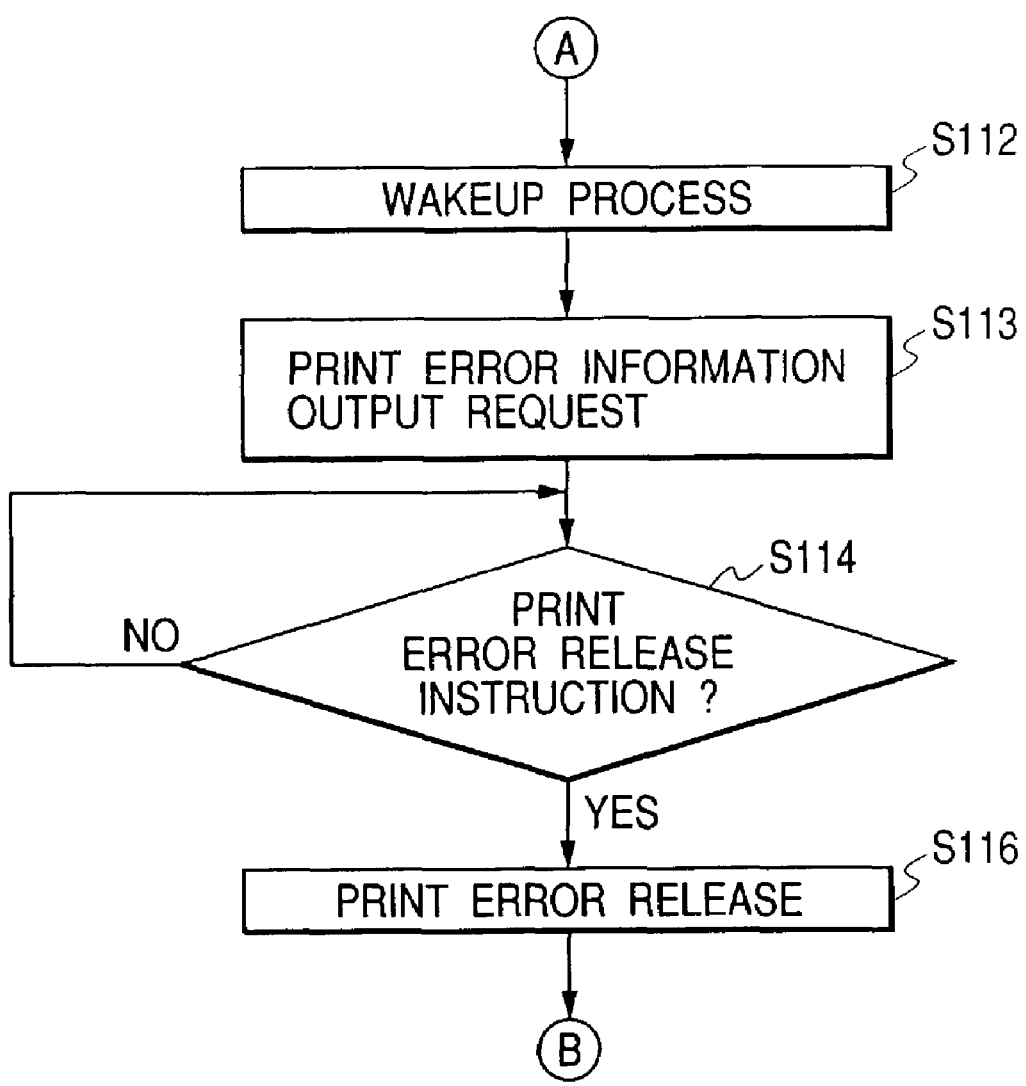
FIG. 5 is a flowchart of a print process which is executed in the cradle type printer device 1 for the portable terminal.

FIG. 4 and FIG. 5 are flowcharts of a print process which is executed in the cradle type printer device 1 for the portable terminal in FIG. 1.

In FIG. 4, when the portable terminal 200 is connected to the connector 4 by the portable terminal 200 being placed on the cellular phone placing section 5 (step S100), power is supplied from the AC power input unit 108 via the charge connecting unit 109 (step S101).

Next, when the instruction key 2 for instructing execution of printing is pressed down by the user (YES in step S102), wakeup process of the cellular phone 200 is performed (step S103). The wakeup process is to bring the cellular phone 200 into an operable state by outputting a wakeup signal from the I/F unit 110 when the cellular phone 200 is in a sleep state.

Thereafter, a retrieve signal of print information previously reserved in the cellular phone 200 is outputted to the cellular phone 200 via the I/F unit 110 to start retrieving the print information (step S104), and it is determined whether or not previously reserved print information exists in the storage unit 208 of the cellular phone 200 (step S105).

When the previously reserved print information does not exist as a result of the determination in step S105, a signal to request information output request without print information is outputted to the cellular phone 200 via the I/F unit 110 (step S106), and a command is given to return to step S102. When the cellular phone 200 receives the signal in step S106, an appropriate message may be displayed on the display device 203, or a buzzer or a speaker not shown which the cellular phone 200 has may be used. Thus, it is made possible to inform the user that the print process is not performed since the print information does not exist.

Meanwhile, when previously reserved print information exists as a result of the determination in step S105, the print information is retrieved from the cellular phone 200 via the I/F unit 110, and the type of the print information is determined (step S107).

When the retrieved print information is URL information received from the communication means 206 as a result of the determination of step S107, the URL print process in FIG. 6 that will be explained below is performed (step S108); when the retrieved print information is still image information picked up by the image pickup unit 205, the still image print process in FIG. 7 that will be described later is performed (step S109); and when it is text information such as e-mail information and address information, the text information print process in FIG. 8 that will be described later is performed (step S110).

Figure 6:
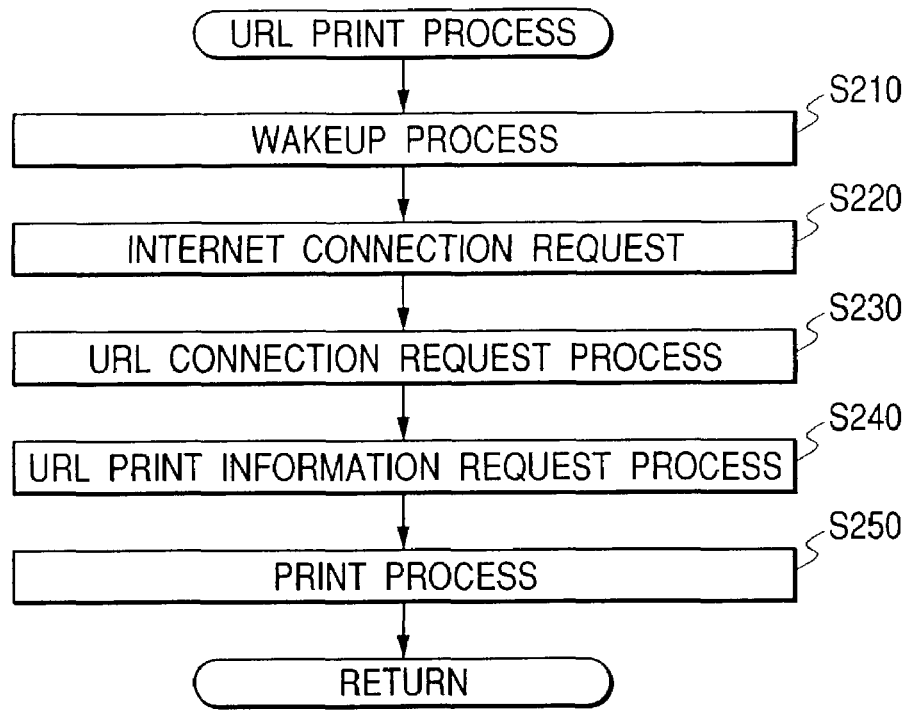
FIG. 6 is a flowchart of a URL print process in step S108 of FIG. 4.

FIG. 6 is a flowchart of the URL print process in step S108 in FIG. 4.

At first, considering the case in which the cellular phone 200 is in a sleep state, the aforementioned wakeup process in step S103 in FIG. 4 is performed (step S210), and thereafter a signal to request connection to an Internet service provider is transmitted to the cellular phone 200 via the I/F unit 110 (step S220). The cellular phone 200 that receives this signal performs connection to the predetermined Internet service provider.

Next, a signal to request to connect to the URL, which is obtained in the aforementioned step S104 in FIG. 4, via the Internet service provider connected by the cellular phone 200 is transmitted to the cellular phone 200 via the I/F unit 110 (step S230). The cellular phone 200 that receives this signal connects to the URL the connection to which is requested.

Thereafter, a signal to request print information from the URL connected in step S230 is transmitted to the cellular phone 200 via the I/F unit 110 (step S240). The cellular phone 200 that receives this signal transmits the print information from the URL via the I/F unit 110.

When the print information is inputted from the cellular phone 200, the print process is performed based on the print information (step S250), and the process is finished. At this time, as the print information which is inputted from the cellular phone 200 via the I/F unit 110, Internet home page description language such as HTML, XML, and compact HTML may be suitable if the cradle type printer device 1 for the portable terminal can interpret it. If the cradle type printer device 1 for the portable terminal can interpret only a specified print language, it may be suitable to enable the cellular phone 200 to translate the Internet home page description language such as HTML, XML, and compact HTML into the specified print language which the cradle type printer device 1 for the portable terminal can interpret and thereafter input it.

Figure 7:
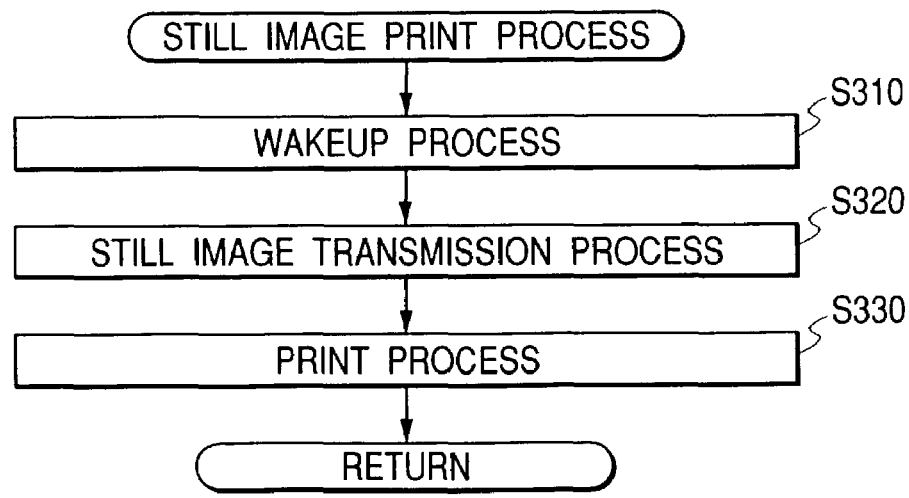
FIG. 7 is a flowchart of a still image print process in step S109 of FIG. 4.

FIG. 7 is a flowchart of the still image print process in step S109 in FIG. 4.

Considering the case in which the cellular phone 200 is in a sleep state, the aforementioned wakeup process in step S103 in FIG. 4 is performed at first (step S310), and thereafter a signal to request the still image information obtained in step S104 in FIG. 4 is outputted to the cellular phone 200 via the I/F unit 110 (step S320). The cellular phone 200 that receives this signal transmits the still image information to the cellular phone 200 via the I/F unit 110.

When the still image information is inputted from the cellular phone 200, the print process is performed based on the still image information (step S330), and the process is finished. At this time, as the print information which is inputted from the cellular phone 200 via the I/F unit 110, it may be suitable to input the still image information such as JPEG (Joint Photographic Experts Group), PNG (Portable Network Graphics), and BMP (Bit Map Data) itself, if the cradle type printer device 1 for the portable terminal can interpret such still image information, or if it can interpret only a specified print language, it may be suitable to enable the cellular phone 200 to translate the still image information such as JPEG, PNG and BMP into the specified print language which the cradle type printer device 1 for the portable terminal can interpret and thereafter input the information.

FIG. 8 is a flowchart of the text information print process in step S110 in FIG. 4.

Considering that the cellular phone 200 is in a sleep state, the aforementioned wakeup process in step S103 in FIG. 4 is performed at first (step S410), and thereafter a signal to request text information obtained in step S104 in FIG. 4 is outputted to the cellular phone 200 via the I/F unit 110 (step S420). The cellular phone 200 that receives this signal transmits the text information to the cellular phone 200 via the I/F unit 110.

When the still image information is inputted from the cellular phone 200, the print process is performed based on the still image information (step S430), and the process is finished. At this time, as the text information which is inputted from the cellular phone 200 via the I/F unit 110, the text information itself such as an ASCII code, a JIS code and UNICODE may be suitable if the cradle type printer device 1 for the portable terminal stores expandable font data in the ROM 101 therein. If the cradle type printer device 1 for the portable terminal can interpret only a specified print language, it may be suitable to enable the cellular phone 200 to translate the text information such as the ASCII code, JIS code and UNICODE into the specified print language, which the cradle type printer device 1 for the portable terminal can interpret and thereafter input the information.

Returning to FIG. 4, in the following step S111, it is determined whether or not each print process in steps S108, S109 and S110 is normally finished, and when it is normally finished as a result of the determination, the print information deleting process in FIG. 9 that will be explained below is performed (step S115), and thereafter a command is given to return to step S102.

FIG. 9 is a flowchart of the print information deleting process in step S115 in FIG. 4.

Considering the case in which the cellular phone 200 is in a sleep state, the aforementioned wakeup process in step S103 in FIG. 4 is performed at first (step S510).

Thereafter, it is determined whether or not the print information deleting designation exists (step S520). The determination of the existence of the print information deleting designation is performed when a signal to inform that the user previously makes designation of deletion of the print information is transmitted from the cellular phone 200 via the I/F unit 110 when the user previously makes designation of deletion of the print information after finishing the print.

When the print information deleting designation exists as a result of the determination in step S520, a signal to request print information deletion is transmitted to the cellular phone 200 via the I/F unit 110 (step S530), and the process is finished. When the cellular phone 200 receives the signal to request print information deletion, the previously reserved print information is deleted, whereby it can be prevented that printing is performed again based on the print information in spite of the printing being already finished.

Meanwhile, when the print information deleting instruction does not exist as the result of the determination in step S520, the process is finished as it is.

It may be suitable to enable the user to previously designate to store the print information after the printing is finished. In this case, when the printing is normally finished, the cellular phone 200 releases the print designation instead of deleting the print information, and stores the print information in a predetermined storage medium. Thus, even when the printing is already finished, the user can appropriately perform printing based on the stored print information.

Returning to FIG. 4, when a print error occurs in any of the aforementioned print processes and the printing is not finished normally as the result of the determination in step S111, the wakeup process in the aforementioned step S103 is performed considering the case in which the cellular phone 200 is in a sleep state (step S112 in FIG. 5), and thereafter, the print error information output request is outputted to the cellular phone 200 from the I/F unit 110 (step S113). It may be suitable to display a suitable message on the display device 203, or use a buzzer or a speaker not shown, which the cellular phone 200 has, when the cellular phone 200 receives the signal in step S113. Thus, it makes possible to inform the user that an error occurs during printing.

Subsequently, when release of the print error is instructed by the user (YES in step S114), the pint error is released (step S116), and a command is given to return to the process in step S102. The determination that the release of the print error is instructed by the user is performed when a signal to notify that the user enters a specified key in the control unit 204 of the cellular phone 200 is transmitted from the cellular phone 200 via the I/F unit 110 after the output of the print error information in step S113. Thus, the error occurring during printing can be surely released.

According to the embodiment, after connecting the cellular phone 200 to the cradle type printer device 1 for the portable terminal (step S100), the user only presses down the print instruction key of the cradle type printer device 1 for the portable terminal (YES in step 102), whereby when the previously reserved print information exists in the storage unit 208 of the cellular phone 2000 (YES in step S105), the cradle type printer device 1 for the portable terminal performs printing according to the type of the previously reserved print information (steps S108, 109 and 110), thus making it possible to easily execute printing of the print information such as the URL information, still image information and text information, which is previously reserved in the storage unit 208 of the cellular phone 200, by a simple print starting instruction operation.

When a plurality of copies of a plurality of kinds of, or the same kind of print information that are reserved with the cellular phone 200 are required, the cradle type printer device 1 for the portable terminal may loop each print process shown in steps S108, S109 and S110 in FIG. 4 according to the designated kinds and number of copies.

If it is not taken into consideration to charge the cellular phone 200, it is not always necessary to place the cellular phone 200 on the cellular phone placing portion 5 and connect it to the connector 4 to perform data communication, and therefore it may be suitable to perform data communication by using radio means such as IEEE802.11b using RF of 2.4 GHz, Bluetooth, and HomeRF. In this case, it is possible to operate the printer with a battery.

If a nonvolatile memory such as flash memory, which is sufficient to store print information, is added to the cradle type printer device 1 for the portable terminal, the process of transmitting a large quantity of print information to the added nonvolatile memory by the cellular phone 200 and performing printing is made possible. In this case, the print information transmitted to the nonvolatile memory can be stored and deleted according to the designation of the user.

It goes without saying that the present invention is applicable to the case in which a storage medium that stores program module of software that realizes the function of the aforementioned embodiment is attained by supplying program to the cradle type printer device 1 for the portable terminal. In this case, the program module itself which is read from the storage medium realizes the new function of the present invention, and the storage medium which stores the program constructs the present invention.

The program module in the above-described embodiment is stored in the ROM 101, and as the storage medium which supplies the program module, for example, floppy (Trade name), a disc hard disc, an optical disc, an optical magnetic disc, CD-ROM, CD-R, DVD, a magnetic tape, a nonvolatile memory card and the like can be used.

As explained in detail thus far, the cradle type printer device for the portable terminal prints a predetermined image based on the print information previously reserved in the cellular phone when the portable terminal is connected to the connecting unit and the print instruction key is pressed down, thus making it possible to execute printing of the predetermined image based on the print information previously reserved in the cellular phone with a simple print starting instruction operation.

In order to print a still image of which print is desired as a predetermined image out of the still images that are electronically picked up with the portable terminal, the image data of the still image of which print is desired is reserved as print information, and therefore print of the still image previously reserved in the portable terminal including the function of a digital camera or the like can be easily executed.

The predetermined image is an object of which print is desired out of the objects displayed by the portable terminal, and print information may be URL of the object of which print is desired, thus making it possible to easily execute print of the object of the URL based on the URL that is previously reserved in the portable terminal including the Internet connection function.

If the kind of the print information is determined as URL when the print instruction key is pressed down, the instruction is given to transmit the object of the URL, which is reserved as print information in the portable terminal, and therefore print of the object of the URL can be executed easily and reliably based on the URL previously reserved in the portable terminal including the Internet connection function.

When an error occurs while a predetermined image is printed based on the print information previously reserved with the portable terminal, the output instruction of the error information by the indicator or the warning device of the portable terminal is given, and therefore it is possible to notify the user that the error occurs during printing.

Since an error is released when the instruction to release the error, which occurs during printing, is performed in the operation unit of the portable terminal, the error which occurs during the printing can be surely released.

When the print of the predetermined image based on the print information reserved in the portable terminal is finished normally, and the user previously makes the designation to delete the print information with the operation unit of the portable terminal after the print of the predetermined image is finished, the instruction to delete the print information is given to the portable terminal, and therefore it can be prevented that print is performed again based on the print information in spite of printing being already finished.

When print of the predetermined image based on the print information reserved in the portable terminal is finished normally, and the user previously designates storage of the print information with the operation unit of the portable terminal after print of the predetermined image is finished, the instruction to store the print information is given to the portable terminal, and therefore the user can appropriately perform printing based on the stored print information even when the printing is already finished.

Since the portable terminal is charged when the portable terminal is connected to another connecting unit, charge of the portable terminal can be easily performed.

The connecting unit for data communication and the connecting unit for charging the portable terminal are integrated, and thus the print process of the predetermined image based on the print information previously reserved in the portable terminal and charge of the portable terminal can be facilitated.

When the portable terminal is connected to the connecting unit and the print instruction key is pressed down, the print information is stored, thus making it possible to perform the process of transmitting a large quantity of print information to the memory from the portable terminal and printing it, and to store and delete the print information transmitted to the memory according to the designation of the user.

What is claimed is:

1. A cradle which is connectable to a portable terminal, comprising:
   a connector connectable to a portable terminal;
   an instruction device configured to instruct execution of print by a user operation;
   a request device configured to request the portable terminal connecting via said connector to output the print information that is set by an operation unit of the portable terminal in advance, in accordance with said print instruction from said instruction device;
   a discrimination device configured to discriminate, based on a response to the request by said request device, whether or not the print information is set in the portable terminal;
   a print device configured to execute print process based on the print information transmitted from the portable device in response to said request; and
   a notification device configured to notice to the portable terminal that the print information is not set, according to the discrimination by said discrimination device, wherein, based, on the notice, the portable terminal notices to a user that the print information is not set.

2. The cradle according to claim 1, wherein said portable terminal is able to pick up an image electronically, and
   the print information is an image picked up by said portable terminal.

3. The cradle according to claim 1, wherein said print information is URL which designates information for printing.

4. The cradle according to claim 3, wherein when print execution is instructed by said instruction device, said cradle requests an object or said URL from the portable terminal, and the object, which is transmitted from the portable terminal, is printed.

5. The cradle according to claim 1, wherein when an error occurs during printing by said print device, said cradle requests warning of the error from said portable terminal.

6. The cradle according to claim 1, further comprising:
   a determination device configured to determine whether instruction to delete the print information of which the print device completed the print process is given by a user; and
   a deleting device configured to delete corresponding print information according to the determination by said determination device.

7. The cradle according to claim 1, wherein the portable terminal reserves is able to reserve the print information to be output to the cradle, further comprising:
   a determination device configured to determine whether instruction to delete the print information of which said print device completed the print process is performed by a user; and
   a release device configured to release print reservation of the corresponding print information according to the determination of said determination device.

8. The cradle according to claim 1, further comprising:
   a charge device configured to charge the portable terminal when said portable terminal is connected to said connecting unit.

9. The cradle according to claim 1, wherein the print information received by the portable terminal is reserved for print by the portable terminal.

10. The cradle according to claim 1, wherein said request device requests the portable terminal connected to said connector to output of the print information, in case of being instructed by said instruction device.

11. A control method of a cradle which is connectable to a portable terminal via a connector, comprising:
    detection step of detecting print instruction input by manipulations in a manipulation unit of said cradle;
    request step of requesting the portable terminal connecting via the connector to output the print information that is set by an operation unit of the portable terminal in advance, in accordance with said detection by said detection step;
    discrimination step of discriminating, based on a response to the reguest in said request step, whether or not the print information is set in the portable terminal;
    print step of executing print process based on the print information received from the portable terminal which received said request; and
    notification step of noticing to the portable terminal that the print information is not set, according to the discrimination in said discrimination step, wherein, based on the notice, the portable terminal notices to a user that the print information is not set.

12. A system having a cradle which is connectable to a portable terminal, said cradle, comprising:
    a connector connectable to the portable terminal;
    an instruction device configured to instruct execution of print by a user operation;
    a request device configured to request the portable terminal connecting via said connector to output the print information that is set by an operation unit of the portable terminal in advance, in accordance with said print instruction from said instruction device;
    a discrimination device configured to discriminate, based on a response to the request by said request device, whether or not the print information is set in the portable terminal;

a print device configured to execute print process based on the print information transmitted from the portable device in response to said request; and a notification device configured to notice to the portable terminal that the print information is not set, according to the discrimination by said discrimination device, wherein, based on the notice, the portable terminal notices to a user that the print information is not set.

13. The system according to claim 12, wherein said portable terminal is able to reserve the stored information to print, and said request unit requests output of the information reserved by said portable terminal.

* * * * *